Dec. 17, 1946.                    J. K. WOOD                         2,412,852
                              SUPPORT DEVICE
                         Filed Jan. 28, 1944                4 Sheets-Sheet 1
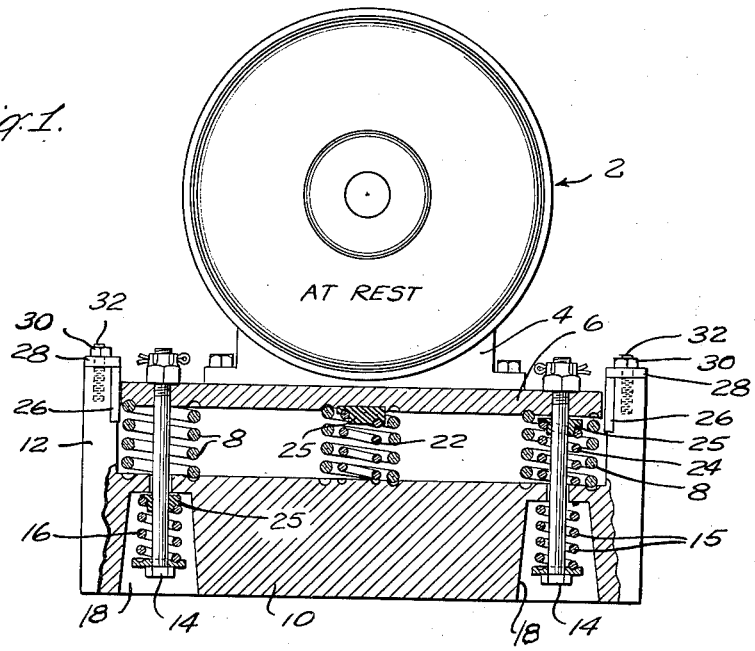
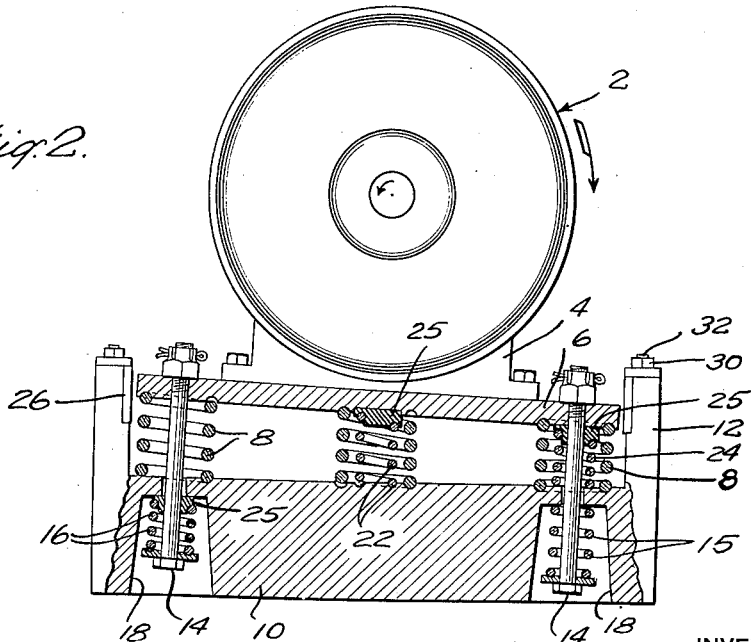
INVENTOR
J. KAYE WOOD
ATTORNEYS Dec. 17, 1946.   J. K. WOOD   2,412,852
SUPPORT DEVICE
Filed Jan. 28, 1944   4 Sheets-Sheet 2

INVENTOR
J. KAYE WOOD
BY Blair, Curtis & Hayward
ATTORNEYS

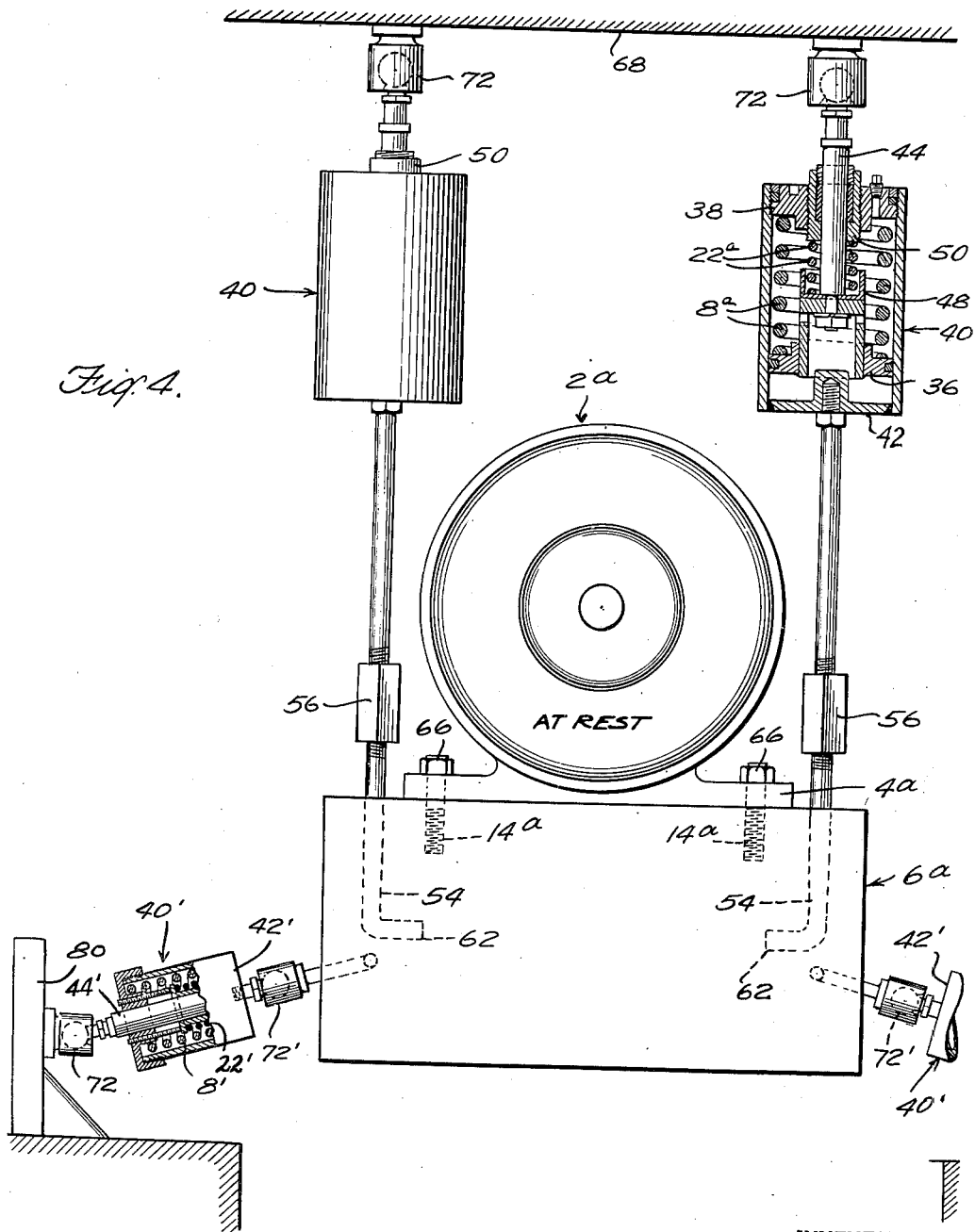

Dec. 17, 1946. J. K. WOOD 2,412,852
SUPPORT DEVICE
Filed Jan. 28, 1944 4 Sheets-Sheet 4

INVENTOR
J. KAYE WOOD
BY Blair, Curtis & Hayward
ATTORNEYS

Patented Dec. 17, 1946

2,412,852

UNITED STATES PATENT OFFICE 2,412,852

SUPPORT DEVICE

Joseph Kaye Wood, New York, N. Y., assignor to General Spring Corporation, New York, N. Y., a corporation of New York Application January 28, 1944, Serial No. 520,007

4 Claims. (Cl. 248—20)

This invention relates to vibration damping supports for fixedly located machinery which are designed particularly to damp vibrations of the machinery that might otherwise be transmitted to the foundation on which the machinery is carried. The term "foundation," as used herein is intended to cover not only any floor, platform or other similar structure upon which a machine rests and to which it is usually attached, but also any overhead structure from which a machine is suspended and any wall or other upright structure against which it may bear or to which it is attached, the object of the invention being to damp vibrations between machinery and any part of the building which supports, braces or otherwise comes into contact with the machinery.

A general object of the invention is to provide means for damping vibrations between fixedly located machinery and its foundation, which comprises a main supporting spring or springs mounted between said machinery and its foundation and adapted to cushion said machinery from the foundation, the spring or springs being so proportioned to the load imposed upon it or them by the machinery that each spring is normally deflected through only a part of its available amplitude whereby the spring support thus provided is capable of resiliently accommodating vibratory movements of the machinery both up and down, in combination with means, such as an auxiliary spring or springs, to prevent or to damp out harmonic vibration which may be set up in the spring or springs by a change of load or other vibrating influences.

It will be apparent that when a fixedly located machine is provided with a spring support upon which it rests, the machine when not operating, will impose upon the springs a definite dead load and that, when operating, what may be called its "live load" will be either added to or subtracted from the dead load imposed upon the springs. In a machine, such, for example, as an electric motor used to drive other machinery, which generates considerable torque, the live load, when superimposed upon the dead load of the machinery, will necessarily produce different effects upon different parts of the spring support. This torque, which, in the case of an electric motor, tends to rotate the motor base in a direction opposite to the direction of rotation of the motor, will obviously cause an increased compression of the springs upon one side of the motor support and a lessening of the compression upon the other side in respect to that produced by the dead load in a support of the type just referred to.

Having regard to the various problems presented in providing a support which will serve to damp vibrations of machinery that otherwise might be transmitted to its foundation, the invention aims particularly to provide a vibration damping support that can readily be adapted to meet any condition. With this end in view the invention aims so to arrange the auxiliary spring or springs in relation to the main spring or springs of a support that each auxiliary spring is arranged to come into action between the machinery and its foundation at a position of the machinery within, and advantageously approximating the mean of, its normal operating position range at the point of support.

In the case of machines either generating considerable torque or to which considerable torque is applied, it will be apparent that the mean operating position on one side may be different from that on the other side and that the purpose of the auxiliary spring may better be served if its action be opposed to the action of the torque, whereas the main spring is ordinarily opposed to the dead weight of the machine. Likewise with machines generating inertial forces or to which intermittent forces are applied, it is advantageous to oppose the auxiliary springs to the live load.

Other objects and important features of the invention will appear from the following description and claims when considered in connection with the accompanying drawings, in which—

Figure 1 is an end elevation, with the support shown partly in section, of a machine, such as an electric motor, mounted on a vibration damping support embodying the present invention but not in operation;

Figure 2 is a view similar to Figure 1, but under mean operating load;

Figure 4 is an end elevation of a machine in which vibration damping supports, utilizing the same principle of operation, are arranged between an overhead foundation and the machine, this view also showing vibration damping means arranged between the machine and the floor;

Figure 5:
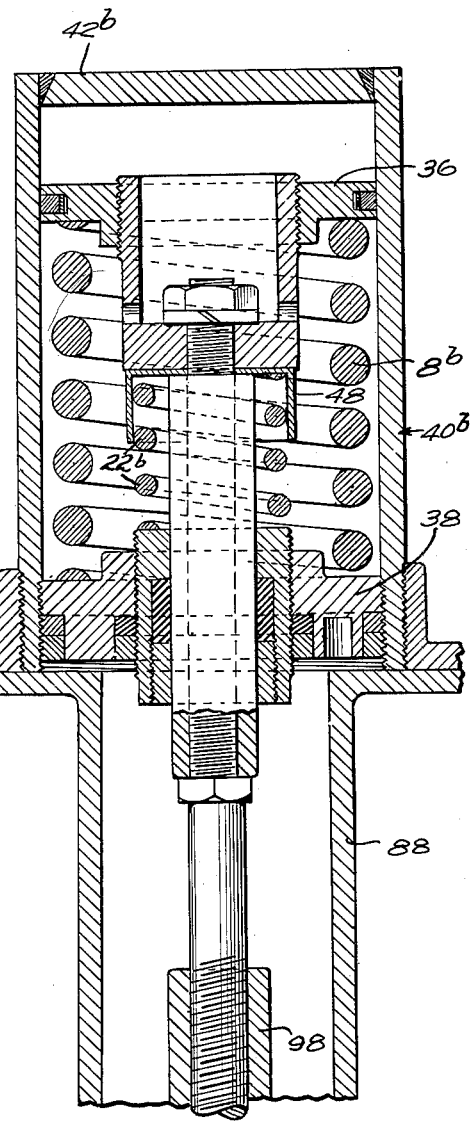
Figure 5 is a sectional view of the damping mechanism taken on line 5—5 of Figure 6.

In the simple form of vibration damping support shown in Figures 1 and 2, the electric motor or generator 2, the vibrations of which are to be damped by the support of the present invention, has the base 4 of its housing mounted on a platform 6 constituting a part of the vibration damping support, the platform 6 being in turn mounted upon a plurality of main springs 8, preferably of uniform pitch. As shown particularly in Figures 1 and 2, the main springs 8 are located between the platform 6 and a foundation 10 in the form of an open box-like structure having side walls 12 within which the platform 6 is shaped to fit and by which it is guided in its up and down movements.

As hereinabove pointed out, the springs 8 are of such strength that the weight of the machinery, such as the motor 2, does not deflect them throughout their entire available amplitude, thus permitting them to accommodate vibratory movements of the motor 2 both up and down. As will be seen from an inspection of Figures 1 and 2, the upward movement from normal dead load position shown in these figures is preferably limited by bolts 14 which serve to hold the motor 2 in position upon the platform 6 and which extend through the foundation 10 with their heads located in recesses 18 of sufficient depth to accommodate the buffer springs 15 and 16 respectively which accommodate vertical vibratory movements of the motor.

With the construction so far described it will be apparent that under certain conditions the vibrations which the motor 2 may transmit to the springs 8 might reach a resonant frequency and thus set up more or less violent harmonic vibrations in the motor and other apparatus connected to it. The springs 8 in such case would thus not only fail to absorb vibrations but might actually increase them. To avoid this the invention contemplates the provision of auxiliary springs 16, 22 and 24, preferably associated with the main springs 8 as shown. The auxiliary springs 16 and 24, as shown by comparison of Figures 1 and 2, are preferably so constructed and arranged that they do not come into action, or, in other words, do not oppose the dynamic load in the form shown, except at substantially the mean position of the motor when operating under normal load. Moreover, the main springs are of such stiffness that with all expected variations of dynamic load, the auxiliary springs 16 and 24 will come into action within the amplitude of vibratory movements of the main springs 8. This means that the action of the auxiliary springs extends over only a part, advantageously substantially half, of such vibratory movement and that, during the remaining part of the movement, only the main springs 8 will oppose the load.

Figure 3:
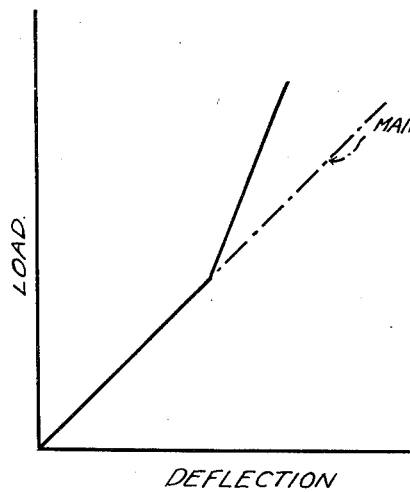
Figure 3 is a graph showing the load deflection characteristics of the springs.

It will be observed that the auxiliary springs 16 and 24 act in opposite directions, but being on opposite sides of the axis of the motor, each exerts a movement which is opposed to the dynamic load, i. e., the torque of the motor. This is of advantage but is not necessary to the damping action of the auxiliary springs. Any or all of the auxiliary springs may act in support of or in opposition to the main springs 8. It will be seen that in either case the graph of deflection of the main spring will bend to a different slope at the point where the auxiliary spring comes into action, as shown in Figure 3.

As herein shown, the auxiliary spring 24, associated with each main spring 8 on the side of the motor which is depressed by the dynamic load is arranged so that it barely touches the under side of the platform 6 in the mean operating position of the motor 2, so that it does not come into action to supplement the action of the main spring 8 until the platform 6 begins to move downwardly in response to vibrations of the motor 2. When, however, the platform again moves upwardly, as soon as it gets beyond its mean position, that is, the position corresponding to the mean operating position of the motor 2, shown in Figures 1 and 2, it moves out of engagement with the upper end of the auxiliary spring 24 and the main spring, throughout that part of its movement, is free to respond to any imposition thereupon by the motor of a frequency of vibration corresponding to its characteristic frequency. This does not, however, result in setting up resonance in the main springs 8 because, as soon as the vibration of the motor carries it back below its mean or dead load position, the auxiliary spring 24 again comes into action and the load deflection characteristic of the spring system acting upon the motor is again sharply changed with the result that any tendency of the spring 8 to harmonic vibration will be opposed and damped.

The auxiliary spring 22, being in a neutral position with respect to the vertical components of the dynamic load, is just in contact at the position of its associated spring 8 under compression by the dead weight of the motor. Thus whether the motor is operating or idle, the spring 22 will serve to damp vibrations in the manner just described in connection with the springs 16 and 24 when under dynamic load.

To prevent clattering or pounding of the auxiliary springs 16, 22 and 24 when they come into and out of bearing against the platform 6 and the recess 18, respectively, in the vibratory movement thereof, these springs have at their upper ends cushioning means 25, e. g., rubber plugs, which deaden any sound of the contact of the springs therewith. As shown these are made of any tough sound deadening material, such for example as a rubber bonded fibrous mass, molded or otherwise shaped to fit into and over the end coil of the spring.

As shown in the drawings, the foundation 10 may be made of concrete, wood, metal or other usual foundation material. Inserts 26 of sound deadening material may be provided adjacent to the side edges of the platform 6 if the foundation is of a hard material which would cause noise if struck by the platform 6; or the sides 12 may be omitted altogether, if other means are used to withstand the lateral thrust due to the torque of the motor. These inserts may be made removable, to permit replacement thereof, by securing them in position by a clamping plate 28 held in clamping relation thereto by nuts 30 screwed upon studs 32 embedded in the concrete.

Figure 6:
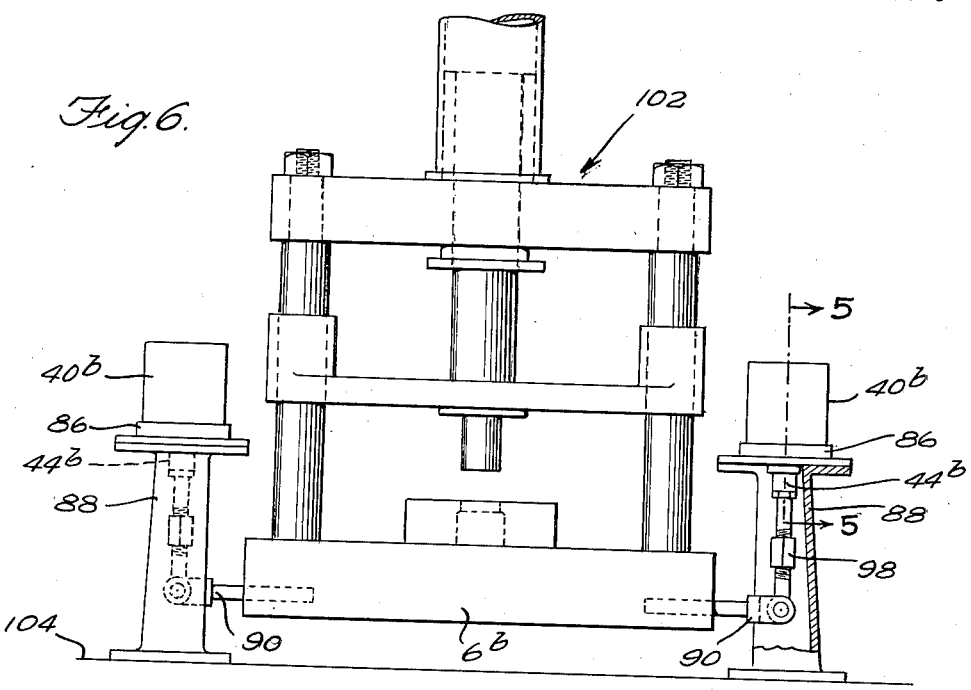
Figure 6 shows an end elevation of another modified form applied to a hydraulic type press.

In the form of the invention shown in Figures 4 to 6 inclusive, the vibration damping means employed to damp vibrations between the machinery and its foundation is an enclosed type. In this type of vibration damping means, two of which are shown in section in Figure 4 and another in Figure 5, the main load supporting spring 8 is confined between a piston 36 at one end and a head 38 at its other end, the piston moving within a cylinder 40 into which the head 38 is screwed.

The end of the cylinder 40 opposite the head 38 is closed by a fixed head 42. The cylinder may be connected as shown to any stationary or movable object. The piston 36 is provided with a piston rod 44 by which it in turn may be connected to any movable or stationary object.

In the construction thus far described, the main load supporting spring 8'; 8a, or 8b, which is of uniform pitch like the corresponding springs 8 shown in Figures 1 to 4, inclusive, is of such strength that, under the load for which it is designed, it will be deflected through only a part of its available amplitude. If this spring alone were relied upon to cushion the load with respect to its foundation, there would be nothing to prevent the setting up in the spring of harmonic vibrations corresponding to certain load changes or vibrations. To prevent this in the forms of the invention shown in Figures 4 to 6, inclusive, each spring 8', 8a, or 8b has associated therewith an auxiliary spring 22', 22a or 22b having one end preferably confined within a socket 48 attached to the piston 36. At its other end the auxiliary spring 22', etc. bears against an adjustable abutment 50 adjustably secured to the head 38, so that the point in the deflection of the spring 8', 8a or 8b at which the auxiliary spring comes into action may be varied to accommodate different mean deflections under load.

The cylinder 40 may be sealed or vented. If sealed, it may be substantially filled with liquid, e. g. oil or grease, or a gas, e. g., air. If filled with a liquid, this structure will impose a more or less severe damping action on any vibratory movements because of the necessity for the liquid to flow through the restricted orifice in, or around the edges of, the piston 36.

From the foregoing description it will be seen that when the auxiliary spring 22 is so adjusted with respect to the normal deflection of the main spring 8 that it only comes into action at a position of the machinery or other load approximating its mean normal operating position, then, when the vibrations of the machinery or other load tend to increase the deflection of the spring 8 the spring 22 will be brought into action and the load deflection characteristic of the system, as shown in Figure 3, will have a sharp change. When, however, the vibration of the machinery or other load carries it in the other direction so that the compression of the main spring 8 becomes less, the abutment 48 or 25 tends to move out of engagement with the upper end of the auxiliary spring 22, or vice versa, and the load deflection characteristic of the spring system is restored to that which existed before the auxiliaries 22 came into action; thus again causing a sharp change.

The oscillation of the vibrating load across the position at which this change occurs insures that the system can never be in resonance with any vibration for more than one-half cycle at a time. In other words the spring support, as a whole, has no natural period of vibration.

Referring now particularly to Figure 4, it will be seen that the motor or generator 2a, the vibrations of which are to be damped before they reach the foundation, is shown as having its vibration damping support connected thereto in suspending relation. As shown particularly in Figure 4, four vibration damping supports of the type just described are used at the four corners of the platform 6a to suspend the load from its overhead foundation. These supports are adjustable in relation to each other by turnbuckles 56. As herein shown, the rods 54 have bent lower ends 62 embedded in the concrete block which constitutes the platform 6a and the motor base 4a is secured to the block 6a by studs 14a also embedded in the block 6a and threaded at their upper ends to receive clamping nuts 66.

The piston rod 44 of each of the vibration damping supports is connected to the overhead structure 68 of the building by a ball and socket connection 72. This provides for such limited lateral swinging movement as may take place in the operation of the machine or as may be necessary to accommodate differences in the deflection of the vibration damping springs upon the two sides of the motor, due to torque.

Further to resist any tendency to lateral movements of the block 6a due to transmission thereto of vibrations of the motor 2a, or to any unequal action upon the two sides thereof due to torque of the motor, there are shown in Figure 4 lateral vibration damping means 40' connected to the sides of the block 6a. As shown in Figure 4, these additional vibration damping means are of the type already described; but in this case the unit can be arranged to act in compression or in tension like the unit 40 in the suspension means. The units 40', as shown, have their fixed heads 42' connected by a ball and socket joint 72' to the concrete platform 6a. The piston rod 44' is connected, in the same manner, by a ball and socket joint 72 to any suitable anchor post or abutment 80.

In the modified arrangement shown in Figures 5 and 6 the vibration damping means are also connected to a supporting block 6b in suspending relation thereto. To accomplish this the cylinders 40b of the vibration damping means may be screwed into suitable outside head blocks 86 to permit their being supported upon suitably shaped stands 88 so that the piston rods 44b of the vibration damping means extend downwardly therefrom between the legs or within the channel of the stand 88, thus permitting simple pivot connection to clevis bolts 90 which have their stems embedded within the concrete of which the block or platform 6b may conveniently be formed. The piston rod 44b in this case is threaded at its lower end so as to constitute a part of a turnbuckle 98, providing for vertical adjustment. By providing four of these stands 88 and four associated vibration damping devices, at the four corners of the platform 6b, it will be seen that the press 102 can readily be so supported that its vibrations will not be transmitted to the foundation or, in other words, will not be transmitted through the stands 88 to the floor 104. And vice versa, any apparatus mounted on the platform 6b will be protected against vibrations which may be transmitted through the floor.

Although for reasons of convenience in engineering and production, compression springs are preferable, e. g., as shown in the drawings it is entirely within the purview of the invention to substitute tension springs for some or all of the main and/or auxiliary springs; such substitution does not essentially change the principle or operation of the invention. The auxiliary spring in either case is adjusted so that it comes into action only for a portion of the vibratory movement which the load would suffer in the absence of the vibration absorbing means of this invention.

Figure 7:
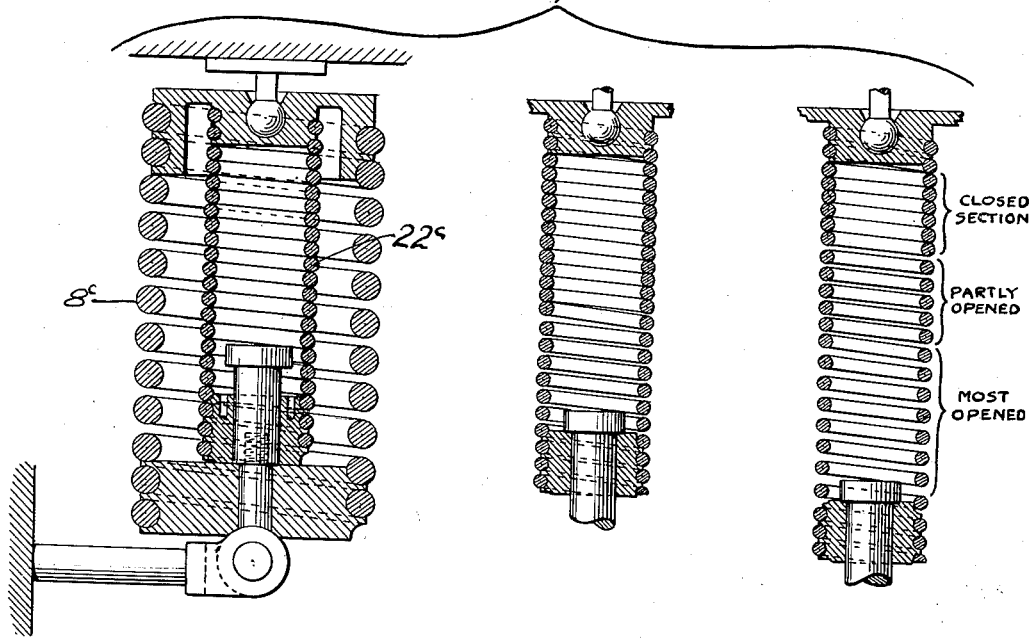
Figure 7 shows diagrammatically and fragmentarily a modification from Figure 5 in which tension springs are used with an auxiliary spring of varying backwind; its successive stages of extension being shown side-by-side in this figure.

It will be apparent that, where a machine passes through a succession of stages of operation between its inoperative dead load condition and its maximum operating condition, the mean operating position may vary at different stages. To be sure that the auxiliary springs come into action at the mean operating or load position for the successive stages of operation, in order to produce the maximum vibration damping effect, a plurality of the auxiliary springs may be used "in parallel" or "in series," designed respectively to come successively into operation at successive stages; or, instead of having more than one auxiliary spring for each main spring or group of main springs, the auxiliary springs associated with the main springs may be made with different sections of different pitch (or "backwind" in the case of tension springs) so that such sections come successively into and out of operation (by closing together of the turns of the spring) as the load passes through its successive stages of operation. Such an arrangement suitable for use in place of the units 40b is shown more or less diagrammatically in Figure 7. To the right of the main figure are sectional views of the auxiliary spring extended to two positions respectively at which damping occurs.

I claim:

1. Vibration resisting apparatus comprising in combination with a machine having fluctuating reaction to dynamic load, but a predetermined mean operating weight inclusive of said dynamic load, a fixed foundation, spring means engaged between said foundation and said machine and capable of substantially balancing and resiliently supporting said mean operating weight, and auxiliary spring means of a length adapted to bring it into substantially unstressed engagement between the machine and said foundation when said spring means is carrying said mean operating weight and in engagement between said foundation and said machine but in substantially unstressed condition.

2. A support for damping vibrations between a fixedly located machine and its foundation, which comprises at least one main spring mounted between said machine and its foundation and adapted to cushion said machine from said foundation, said spring normally being deflected by the load imposed upon it by the machine through only a part of its available amplitude whereby it is capable of resiliently accommodating vibratory movements of the machine, and at least one auxiliary tension spring arranged between, and having a lost motion engagement with, parts affixed respectively to the machine and to its foundation and of free length greater than the minimum and less than the maximum spacing between said parts during normal vibration, whereby said auxiliary spring goes out of and comes into action between the machine and its foundation at a position within the amplitude of such vibratory movements, said auxiliary spring having sections therein of respectively different pitch when the spring is extended to the limit of its operating load.

3. A support for damping vibrations between a fixedly located machine for producing a rotary torque and its foundation, which comprises a pair of main springs mounted respectively on opposite sides of a plane through the torque axis of the machine with the springs being between said machine and its foundation and adapted to cushion said machine from said foundation, each of said springs normally being deflected by the load imposed upon it by the machine through only a part of its available amplitude whereby it is capable of resiliently accommodating vibratory movements of the machine, a first auxiliary spring opposing the main spring on the side of the machine which is lifted by the torque and arranged between, and having a lost motion engagement with, parts affixed respectively to the machine and to its foundation and of free length greater than the minimum and less than the maximum spacing between said parts during normal vibration, whereby said auxiliary spring goes out of and comes into action between the machine and its foundation at a position within the amplitude of such vibratory movements, and a second auxiliary spring opposing the load on the side of the machine which is depressed by the torque.

4. A support according to claim 3 in which one of the auxiliary springs is a tension spring and the other auxiliary spring is a compression spring depending upon which side of the machine is lifted or depressed.

JOSEPH KAYE WOOD.